UNITED STATES PATENT OFFICE.

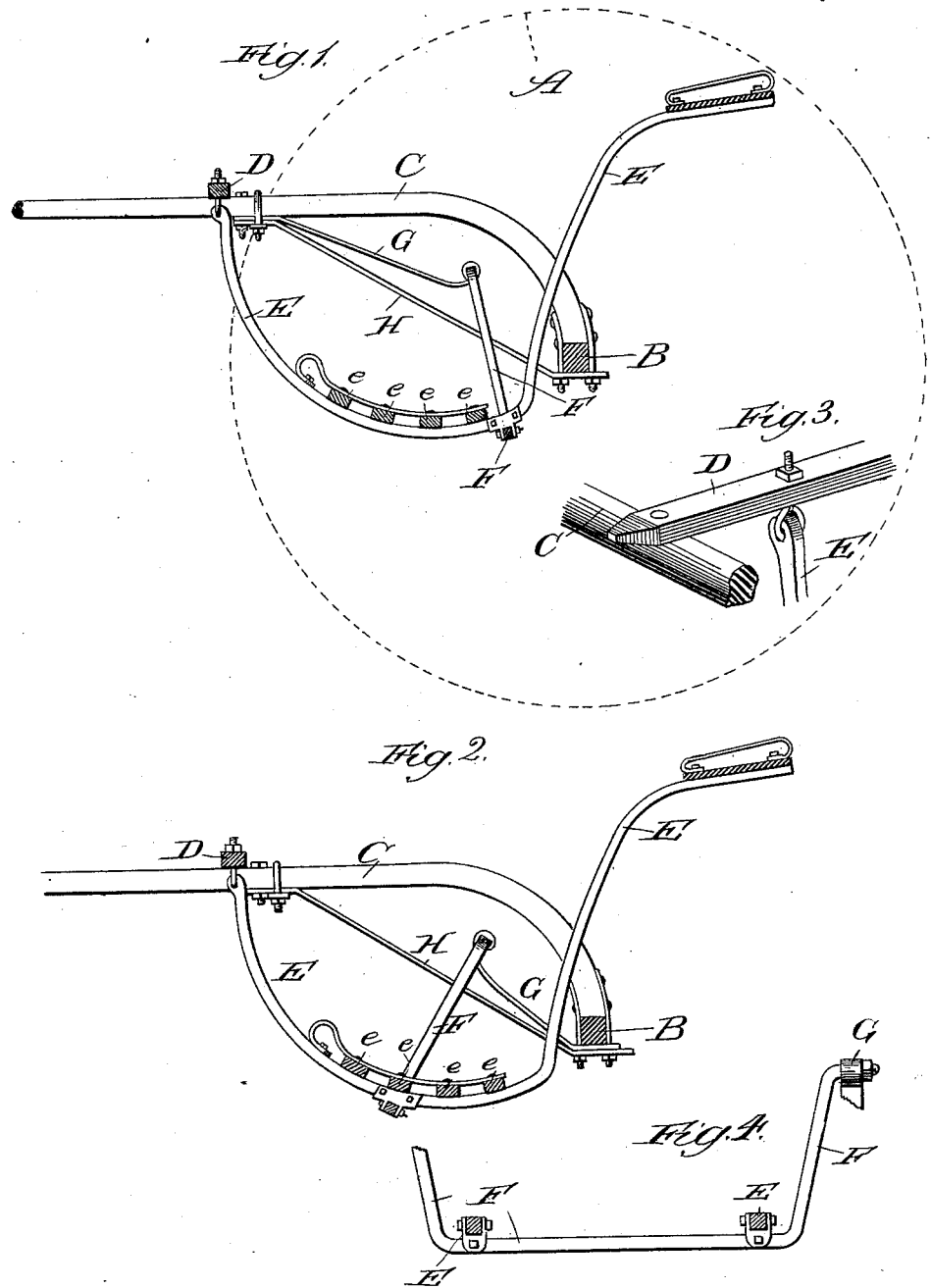

CHARLES A. DAVIS, OF PEORIA, ILLINOIS.

ROAD-CART.

SPECIFICATION forming part of Letters Patent No. 423,860, dated March 18, 1890.

Application filed February 23, 1889. Serial No. 300,906. (No model.)

*To all whom it may concern:*

Be it known that I, CHARLES A. DAVIS, a citizen of the United States, residing at Peoria, Illinois, have invented certain new and useful Improvements in Road-Carts, of which the following is a specification.

The object of my invention, in general terms, is to support the seat and foot-rest and give them a capacity to spring or move independently of the motion of the axle; and my invention consists in the features and details of construction hereinafter described and claimed.

In the drawings, Figures 1 and 2 are sections showing different ways of embodying my ideas, and Figs. 3 and 4 are details showing the connection of parts hereinafter described.

In making my improved road-cart I make the wheels A, the axle B, and the shafts C in the usual way. I arrange a cross-bar D a suitable distance in front of the axle and extending across from one shaft to the other and connected with the shafts. Near the shafts on each side I attach seat-bars E through means of an eyebolt or other suitable connection. These seat-bars preferably curve downward and backward to a point near the axle, when they are bent or turned and extend upward and backward above the axle to a proper height and position for the seat, which rests upon their rear ends, as shown in Figs. 1 and 2. The seat-bars are provided with slats *e* or other suitable flooring to afford a rest for the feet of the driver. Passing across from one seat-bar to the other, and preferably connected rigidly to the bars, I arrange a bail F, which is turned up at its ends, as shown in the drawings. This bail may be arranged at any suitable position in front of the axle, either near the upward bend in the seat-bars, as shown in Fig. 1, or near the front of the foot-rest, as shown in Fig. 2. The upturned ends of the bail are connected to steel springs or elastic bars G, which are intended to sustain a portion of the weight of the seat-bars, foot-rests, and driver when the cart is in use. These springs G may be connected either to the shafts or to the cross-bar D in front, as shown in Fig. 1, or carried back and connected to the axle at the rear, as shown in Fig. 2. I shall speak of the point of their connection, whether at the shafts or at the axle, as a "fixed" part of the cart. They are intended to be of sufficient strength to sustain the weight of the parts and the driver, and yet hold the seat-bars clear of the axle. It is preferable that they should give enough to permit the seat-bars to approach within a few inches of the axle when the cart is in use, as the weight of the driver will thus be largely removed from the shafts, so as to relieve the horse. In this way the seat-bars, through their connection at their front ends and through the connection of the bail to the springs G, will support the driver without contact with the axle and afford capacity for springing or moving in the seat unaffected directly by the movement of the axle, as would be the case if the seat were mounted thereon; nor is the driver's seat affected in its movements by the motions of the horse, but is free to spring or move independently, and thus avoid the horse motion so objectionable in road-carts as frequently constructed.

In order to secure still greater strength in the parts, I prefer to use a brace H, which is preferably a flat bar of steel containing some elasticity and connected at its front end to the shafts and at its rear ends to the axle, as shown in the drawings.

The necessity for elasticity or springiness in the bars H grows out of the fact that when the elastic bars G are arranged directly over them, as shown in the drawings, so that when they are borne down upon the bars H by the weight of the driver, the support of the seat would become rigid and unyielding unless the bars H possessed elasticity to still further yield. As the bars H yield, they will operate through the natural elasticity of the wood composing the shafts to form an elastic or yielding support for the seat. In all other constructions, so far as I am aware, the connection between the heel of the shaft and a point near the support for the seat-bars is effected through a rigid and unyielding bar, and as the elastic bars in such constructions are not placed above and do not bear upon such brace, as in my construction, it is not required to be yielding or elastic.

What I regard as new, and desire to secure by Letters Patent, is—

In a road-cart, the combination of seat-bars supported at their front ends by the shafts, a bail connecting the seat-bars together and upturned at its ends, elastic bars G, connected at one end with the upturned ends of the bail and at the other with a fixed part of the cart, and elastic bars H, arranged under the bars G to receive and form a yielding support for such bars when borne down thereon and connecting the heel of the shaft at the axle to a point on the shaft near the connection of the seat-bars therewith, substantially as described.

CHARLES A. DAVIS.

Witnesses:
G. M. FLENNER,
OLIVER M. LINEBACK.